United States Patent
Amirijoo et al.

(10) Patent No.: US 9,357,415 B2
(45) Date of Patent: May 31, 2016

(54) METHOD AND APPARATUS FOR MONITORING A RANDOM ACCESS CHANNEL

(75) Inventors: Mehdi Amirijoo, Linköping (SE); Erik Eriksson, Linköping (SE); Fredrik Gunnarsson, Linköping (SE); Kristina Jersenius, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 539 days.

(21) Appl. No.: 13/257,640

(22) PCT Filed: Oct. 22, 2009

(86) PCT No.: PCT/SE2009/051204
§ 371 (c)(1),
(2), (4) Date: Sep. 20, 2011

(87) PCT Pub. No.: WO2010/107358
PCT Pub. Date: Sep. 23, 2010

(65) Prior Publication Data
US 2012/0008524 A1    Jan. 12, 2012

Related U.S. Application Data

(60) Provisional application No. 61/161,830, filed on Mar. 20, 2009.

(51) Int. Cl.
*H04L 12/28* (2006.01)
*H04L 12/66* (2006.01)
(Continued)

(52) U.S. Cl.
CPC ............. *H04W 24/10* (2013.01); *H04W 74/08* (2013.01)

(58) Field of Classification Search
CPC .......... H04W 74/0833; H04W 74/008; H04W 28/04; H04W 74/085; H04W 74/0858; H04W 74/0841; H04W 74/004; H04W 74/08; H04W 74/0866; H04W 74/002; H04W 36/30; H04W 72/0413
USPC .......... 370/431, 437, 252, 310–350; 455/434, 455/450, 452.1, 7
See application file for complete search history.

(56) References Cited

U.S. PATENT DOCUMENTS

| | | | |
|---|---|---|---|
| 6,697,346 B1 * | 2/2004 | Halton | H04B 7/216 370/335 |
| 7,899,026 B2 * | 3/2011 | Chun | H04W 74/002 370/332 |

(Continued)

FOREIGN PATENT DOCUMENTS

| | | | |
|---|---|---|---|
| WO | WO 2009022835 A2 * | 2/2009 | |
| WO | WO 2010002303 A1 * | 1/2010 | |

OTHER PUBLICATIONS

Fischer et al. U.S. Appl. No. 60/863,771, filed Oct. 31, 2006.*
(Continued)

*Primary Examiner* — Wutchung Chu
(74) *Attorney, Agent, or Firm* — Coats & Bennett, P.L.L.C.

(57) ABSTRACT

A user equipment for obtaining data for observing performance related to Random Access in a cellular radio system is provided. The user equipment can connect to the system. In order to provide the network/system with data for observing the random access procedure the user equipment measures and stores data needed to compute measurements to be reported to the system. The user equipment further generates a measurement report, and transmits the measurement report based on a trigger event.

30 Claims, 10 Drawing Sheets

(51) Int. Cl.
*H04W 24/10* (2009.01)
*H04W 74/08* (2009.01)

(56) References Cited

U.S. PATENT DOCUMENTS

| | | | | |
|---|---|---|---|---|
| 8,005,012 | B1* | 8/2011 | Aybay et al. | 370/253 |
| 8,189,493 | B2* | 5/2012 | Lee et al. | 370/252 |
| 8,345,571 | B2* | 1/2013 | Kwon et al. | 370/252 |
| 8,369,209 | B2* | 2/2013 | Zhang et al. | 370/216 |
| 2002/0114294 | A1* | 8/2002 | Toskala et al. | 370/329 |
| 2003/0103476 | A1* | 6/2003 | Choi et al. | 370/329 |
| 2004/0081115 | A1* | 4/2004 | Parsa et al. | 370/320 |
| 2005/0143118 | A1* | 6/2005 | Bernhardsson et al. | 455/522 |
| 2006/0203753 | A1* | 9/2006 | Toskala et al. | 370/278 |
| 2006/0215617 | A1* | 9/2006 | Martin | 370/337 |
| 2007/0049314 | A1* | 3/2007 | Balachandran et al. | 455/518 |
| 2007/0214247 | A1* | 9/2007 | Yang et al. | 709/223 |
| 2007/0230600 | A1* | 10/2007 | Bertrand et al. | 375/260 |
| 2008/0198796 | A1* | 8/2008 | Jen | H04W 8/26 370/328 |
| 2008/0259861 | A1* | 10/2008 | Kang et al. | 370/329 |
| 2008/0267126 | A1* | 10/2008 | Vujcic et al. | 370/330 |
| 2008/0287127 | A1* | 11/2008 | Wu | H04W 72/1231 455/434 |
| 2008/0293423 | A1* | 11/2008 | Park | H04L 1/0026 455/450 |
| 2008/0310396 | A1* | 12/2008 | Park | H04W 56/0045 370/350 |
| 2009/0213818 | A1* | 8/2009 | Park | H04W 74/0833 370/336 |
| 2009/0270094 | A1* | 10/2009 | Ito et al. | 455/434 |
| 2010/0024204 | A1* | 2/2010 | Min et al. | 29/623.2 |
| 2010/0034141 | A1* | 2/2010 | Meylan | H04W 74/0833 370/328 |
| 2010/0069037 | A1* | 3/2010 | Fischer et al. | 455/410 |
| 2010/0220713 | A1* | 9/2010 | Tynderfeldt | H04W 56/0045 370/350 |
| 2010/0232318 | A1* | 9/2010 | Sarkar | 370/254 |
| 2011/0003566 | A1* | 1/2011 | Makihara et al. | 455/127.1 |
| 2011/0116364 | A1* | 5/2011 | Zhang | H04W 74/08 370/216 |
| 2011/0165874 | A1* | 7/2011 | Amirijoo et al. | 455/434 |
| 2011/0235529 | A1* | 9/2011 | Zetterberg et al. | 370/248 |
| 2011/0299415 | A1* | 12/2011 | He | H04W 74/0833 370/252 |
| 2012/0147821 | A1* | 6/2012 | Bertrand et al. | 370/328 |
| 2012/0163231 | A1* | 6/2012 | Bertrand et al. | 370/252 |
| 2013/0294382 | A1* | 11/2013 | Xu et al. | 370/329 |
| 2014/0133297 | A1* | 5/2014 | Raleigh et al. | 370/230 |

OTHER PUBLICATIONS

3rd Generation Partnership Project. "RACH Optimization Function." 3GPP TSG RAN WG3 Meeting #63bis, R3-090825, Seoul, South Korea, Mar. 23-26, 2009.

3rd Generation Partnership Project. "Framework for RACH Parameter Optimization." 3GPP TSG RAN WG3, R3-090697, Seoul, Korea, Mar. 23-26, 2009.

3rd Generation Partnership Project. "Framework for UE SON Reports." 3GPP TSG RAN WG3 & SA WG5, S5-090017, Sophia Antipolis, France, Jan. 12-13, 2008.

NGMN Project 12. "Informative List of SON Use Cases." Annex A (informative) of "Use Cases related to Self Organising Network. Overall Description." Detailed Description of uses cases for Self Organizing functionality in 2G/3G/LTE RAN and Core Net, Apr. 17, 2007, pp. 1-36.

3rd Generation Partnership Project. "3rd Generation Partnership Project; Technical Specification Group Services and Systems Aspects; Telecommunication management; Study on Management of Evolved Universal Terrestrial Radio Access Network (E-UTRAN) and Evolved Packet Core (EPC) (Release 8)." 3GPP TR 32.816, V1.3.1, Nov. 2007, Sophia Antipolis Valbonne, France, pp. 1-34.

3rd Generation Partnership Project. "3rd Generation Partnership Project; Technical Specification Group Radio Access Network; Evolved Universal Terrestrial Radio Access (U-UTRA) and Evolved Universal Terrestrial Radio Access Network (E-UTRAN); Overall description; Stage 2 (Release 8)." 3GPP TS 36.300, V8.2.0, Sep. 2007, Sophia Antipolis Valbonne, France, pp. 1-109.

3rd Generation Partnership Project. "3rd Generation Partnership Project; Technical Specification Group Radio Access Network; Evolved Universal Terrestrial Radio Access (E-UTRA); Physical Channels and Modulation (Release 8)." 3GPP TS 36.211, V8.5.0, Dec. 2008, Sophia Antipolis Valbonne, France, pp. 1-82.

3rd Generation Partnership Project. "3rd Generation Partnership Project; Technical Specification Group Radio Access Network; Evolved Universal Terrestrial Radio Access (E-UTRA); Radio Resource Control (RRC); Protocol specification (Release 8)." 3GPP TS 36.331, V8.4.0, Dec. 2008, Sophia Antipolis Valbonne, France, pp. 1-198.

* cited by examiner

Prior Art

Prior Art

Prior Art

METHOD AND APPARATUS FOR MONITORING A RANDOM ACCESS CHANNEL

TECHNICAL FIELD

The present invention relates to a method and a device for of obtaining data for observing performance related to Random Access in a cellular radio system.

BACKGROUND

The work of specifying the Evolved Universal Terrestrial Radio Access Network (E-UTRAN) consisting of the Long Term Evolution (LTE) and System Architecture Evolution (SAE) concepts is currently ongoing within the $3^{rd}$ Generation Partnership Project (3GPP).

One important focus area in E-UTRAN standardization work is to ensure that the new network is simple to deploy and cost efficient to operate. The vision is that the new system shall be self-optimizing and self-configuring in as many aspects as possible, see NGMN, "Operator Use Cases related to Self Organising Networks," ver. 1.53, 2007-04-16 and 3GPP TR 32.816, Study on Management of E-UTRAN and SAE. One aspect that benefits from self-optimization and self-configuration is the management of the random access channel (RACH). Also Ericsson "RACH optimization function" 3GPP draft R3-090825 describes optimization.

The architecture of the LTE system is shown in FIG. 1. FIG. 1 illustrates the LTE architecture showing logical interfaces between eNBs (X2) and between eNB and MME/S-GW (S1). In LTE the downlink is based on orthogonal frequency division multiplexing (OFDM) while the uplink is based on a single carrier modulation method known as discrete Fourier transform spread OFDM (DFT-S-OFDM), see 3GPP TR 36.300, Evolved Universal Terrestrial Radio Access (E-UTRA) and Evolved Universal Terrestrial Radio Access (E-UTRAN); Overall description; Stage 2, V8.2.0.

In the following sections the random access procedure for LTE as it is currently defined by 3GPP is outlined.

Some E-UTRA Physical Layer Details

Downlink and uplink transmissions are in LTE organized into radio frames with 10 ms duration. Two radio frame structures are supported:
Type 1, applicable to Frequency Division Duplex (FDD),
Type 2, applicable to Time Division Duplex (TDD).

Frame structure Type 1 is illustrated in FIG. 2. Each 10 ms radio frame is divided into ten equally sized sub-frames. Each sub-frame consists of two equally sized slots. For FDD, 10 subframes are available for downlink transmission and 10 subframes are available for uplink transmissions in each 10 ms interval. Uplink and downlink transmissions are separated in the frequency domain.

Frame structure Type 2 is illustrated in FIG. 3. Each 10 ms radio frame consists of two half-frames of 5 ms each. Each half-frame consists of eight slots of length 0.5 ms and three special fields: DwPTS, Guard Period (GP) and UpPTS. The length of DwPTS and UpPTS is configurable subject to the total length of DwPTS, GP and UpPTS being equal to 1 ms. Both 5 ms and 10 ms switch-point periodicity are supported. Subframe 1 in all configurations and subframe 6 in configuration with 5 ms switch-point periodicity consist of DwPTS, GP and UpPTS. Subframe 6 in configuration with 10 ms switch-point periodicity consists of DwPTS only. All other subframes consist of two equally sized slots.

For TDD, GP is reserved for downlink to uplink transition. Other Subframes/Fields are assigned for either downlink or uplink transmission. Uplink and downlink transmissions are separated in the time domain.

The physical channels of E-UTRA are:
Physical Broadcast Channel (PBCH)
  The coded BCH transport block is mapped to four subframes within a 40 ms interval;
  40 ms timing is blindly detected, i.e. there is no explicit signalling indicating 40 ms timing;
  Each subframe is assumed to be self-decodable, i.e. the BCH can be decoded from a single reception, assuming sufficiently good channel conditions.
Physical Downlink Control Channel (PDCCH)
  Informs the User Equipment UE about the resource allocation of PCH and DL-SCH, and Hybrid Automatic Repeat Request (ARQ) information related to DL-SCH;
  Carries the uplink scheduling grant.
Physical Downlink Shared Channel (PDSCH)
  Carries the DL-SCH and PCH.
Physical Uplink Control Channel (PUCCH)
  Carries Hybrid ARQ Acknowledgement/Negative Acknowledgements (ACK/NAKs) in response to downlink transmission;
  Carries Scheduling Request (SR);
  Carries Channel Quality Indicator (CQI) reports.
Physical Uplink Shared Channel (PUSCH)
  Carries the UL-SCH.
Physical Random Access Channel (PRACH)
  Carries the random access preamble.

Random Access Procedure in LTE

During initial access, the UE seeks access to the network in order to register and commence services. The random access (RA) serves as an uplink control procedure to enable the UE to access the network. Since the initial access attempt cannot be scheduled by the network, the RA procedure is by definition contention based. Collisions may occur and an appropriate contention-resolution scheme needs to be implemented. Including user data on the contention-based uplink is not spectrally efficient due to the need for guard periods and retransmissions. Therefore, it has been decided to separate the transmission of the random access burst (preamble), whose purpose is to obtain uplink synchronization, from the transmission of user data.

The RA procedure serves two main purposes:
  It lets the UE align its Up-Link (UL) timing to that expected by the base station eNode B in order to minimize interfering with other UEs transmissions. UL time alignment is a requirement in E-UTRAN before data transmissions can commence.
  It provides a means for the UE to notify the network of its presence and enables the eNode B to give the UE initial access to the system.

In addition to the usage during initial access, the RA will also be used when the UE has lost the uplink synchronization or when the UE is in an idle or a low-power mode or when the UE has no dedicated scheduling request resource on the physical uplink control channel (PUCCH).

Prior to sending a preamble, the UE is to synchronize to the downlink transmissions and read the BCH. The BCH will reveal, among other parameters, where the RA time slots are located, which frequency bands can be used and which preambles (sequences) are available. LTE provides for 64 preambles for each cell. The set of preambles allocated to a cell shall not overlap with the set of preambles allocated to a neighboring cell as this could cause errors and ambiguities in preamble detection.

The basic RA Procedure is a four-phase procedure as outlined in FIG. 4:

Phase 1 consists of transmission of a random access preamble, allowing the Node B to estimate the transmission timing of the UE. Uplink synchronization is necessary as the UE otherwise cannot transmit any uplink data.

Phase 2 consists of the network transmitting a timing advance command to correct the uplink timing, based on the timing of arrival measurement in the first step. In addition to establishing uplink synchronization, the second step also assigns uplink resources and temporary identifier to the UE to be used in the third step in the random access procedure.

Phase 3 consists of signaling from the UE to the network using the UL-SCH similar to normal scheduled data. A primary function of this message is to uniquely identify the UE. The exact content of this signaling depends on the state of the UE, e.g., whether it is previously known to the network or not.

Phase 4, the final phase, is responsible for contention resolution in case multiple UEs tried to access the system on the same resource.

For cases where the network knows, in advance, that a particular UE will perform a Random Access Procedure to acquire uplink synchronization, e.g., during Handover (HO), a dedicated preamble is reserved and assigned to the UE under consideration. When the UE transmits the dedicated preamble in Phase 1, the network knows to which UE this preamble was assigned and can already at the time of detection of this preamble determine the identity of the UE. Thus, in this scenario, no contention resolution is needed and the delay before data transmission can be resumed is reduced.

Phase 1—Random Access Preamble

Prior to sending a preamble, the UE shall synchronize to the downlink transmissions and read the BCH. The BCH will reveal, e.g., where the RA time slots are located, which frequency bands can be used and which preambles (sequences) are available.

At the next RA slot, the UE will send the preamble. The preamble sequence implicitly includes a random ID which identifies the UE. LTE provides for each cell 64 such random IDs and thus 64 preambles.

If multiple RA frequency bands have been defined, the UE randomly selects one of them. The group of sequences allocated to a cell is partitioned into two subgroups. By selecting a preamble sequence from a specific subgroup, the UE can give a single-bit indication of its resource requirement and/or link quality. The particular sequence used for the preamble is randomly selected within the desired subgroup. This sequence implicitly contains a random ID which serves as a UE identifier.

The eNode B estimates the UL timing of the UE based on the timing of the received preamble.

Phase 2—Random Access Response

After the preamble transmission, the UE waits for a RA Response message on the DL-SCH, the DL assignment which is indicated on the Layer 1/Layer 2 (L1/L2) control channel (DDCCH).

The RA Response message is transmitted semi-synchronously (i.e. within a window) to the reception of the RA Preamble in order to allow the scheduler more flexibility. The RA Response contains:

the same random UE identity as present in the preamble;

a time alignment message to provide the proper uplink timing to the UE;

a temporary Radio Network Temporary Identifier (RNTI) which is unique for the particular RA resource (time and channel) used in Phase 1. For initial access, the temporary RNTI shall be used for Phases 3 and 4;

an Up-Link (UL) resource grant for transmission on UL-SCH in Phase 3.

If no RA Response message has been received after a certain time following the preamble transmission, the UE shall send a new preamble at the next RA time slot. In some cases the eNodeB may indicate an overload (too many preambles detected) and instruct the UE to wait for some time before attempting random access again. For the new attempt, the UE shall select new, random parameters for the preamble sequence and the non-synchronized RA frequency band. Furthermore, the UE will increase the power level of the preamble to obtain a power ramping procedure similar as used in Wide band Code Division Multiple Access (WCDMA) systems.

Phase 3—First Scheduled UL Transmission

In Phase 3, the UE provides the network with a unique identifier in the message it transmits on UL-SCH according to the grant contained in the RA Response. The type of UE identifier, e.g. C-RNTI, TMSI, IMSI or IMEI, depends on which extent the UE is already known in the network. In case of initial access, the message is a Radio Resource Control (RRC) Connection Request message.

In case of non-initial access, i.e. when the UE is already RRC_CONNECTED, the UE identifier is the C-RNTI and is signaled by the Media Access Control (MAC) layer. The transmission uses Hybrid Automatic Repeat Request (HARQ).

Phase 4—Contention Resolution

The purpose of the fourth phase is to resolve contention. Note that, from the second step, multiple UEs performing simultaneously random access attempts using the same preamble listen to the same response message and therefore have the same temporary identifier. Hence, in the fourth phase, the eNode B echoes the UE identity provided by the UE in Phase 3. Only a terminal which finds a match between the identity received in the fourth step and the identity transmitted as part of the third step will declare the random access procedure successful. This terminal will also transmit a hybrid ARQ acknowledge in the uplink. For non-initial access, i.e. when the UE is already RRC_CONNECTED, the UE identity is reflected on the L1/L2 control channel. If the UE has not yet been assigned a C-RNTI, the temporary identity from the second step is promoted to the C-RNTI, otherwise the UE keeps its already assigned C-RNTI.

UEs which do not find a match between the identity received in Phase 4 and the respective identity transmitted as part of Phase 3 are considered to have failed the random access procedure and need to restart the random access procedure with Phase 1; selecting new random parameters for the preamble sequence and the RA frequency band. No hybrid ARQ feedback is transmitted from these terminals.

Contention-Free Random Access Procedure

For cases where the network knows, in advance, that a particular UE will perform a Random Access Procedure to acquire uplink synchronization, a dedicated preamble is reserved and assigned to the UE under consideration. Dedicated Preamble assignment for HO is handled by RRC whereas preamble assignment for DL data arrival is handled by MAC. When the UE transmits the dedicated preamble in Phase 1, the network knows to which UE this preamble was assigned and can already at the time of detection of this preamble determine the identity of the UE. Thus no contention resolution is needed and the delay before data transmission can be resumed is reduced.

Random Access Back-Off Procedure

For the event of Random Access overload, a Random Access Back-Off procedure is supported. This procedure prevents immediate new Random Access attempts which would only worsen a collision situation.

In case of an overload, the eNodeB signals through the Random Access Response message a backoff indicator B. The UE that does not receive a random access response message that includes the transmitted preamble will wait a time which is uniformly distributed between 0 and B before attempting random access gain.

Random Access Channel Physical Resource

A single RA opportunity consists of a time slot and a fixed bandwidth. The RA time slot length $T_{RA}$ shall accommodate the preamble sent by the UE and the required guard period (GP) to take into account the unknown uplink timing, see FIG. 5. The timing misalignment amounts to 6.7 µs/km. 3GPP has decided for a minimum $T_{RA}$ of 1 ms. Here the preamble length is then 800 µs plus a cyclic prefix of around 102.5 µs. A guard time of 97.5 µs suffices for a cell radii up to 15 km. Larger guard periods and cyclic prefix are needed to accommodate timing uncertainties from cells larger than 15 km. Such large cells may also require longer preambles to increase the received energy. In order to support RA under various cell conditions RAN1 has defined additionally 3 RA preamble formats which require a $T_{RA}$ of 2 ms or even 3 ms. These larger slots are created by the eNode B by not scheduling traffic in the consecutive sub-frame(s). Those extended preambles contain repetitions of the 800 µs long part and/or a longer cyclic prefix.

For TDD an additional "short" RA is defined. The short RA preamble only spans 133 µs. Because of this very short duration the preamble will most likely not contain a cyclic prefix but a technique called overlap-and-add will be used to enable frequency-domain processing, see FIG. 5. At the time of writing many details regarding applicability and performance of this short RA are still open.

According to 3GPP, the bandwidth of a RA opportunity is 1.08 MHz (6 RB). The effective bandwidth utilized by the RA preamble is 1.05 MHz leaving small spectral guard bands on each side. This is necessary since RA and regular uplink data are separated in frequency-domain but are not completely orthogonal.

For FDD systems, RA opportunities do not occur simultaneously in different frequency bands but are separated in time. This spreads out processing load in the RA receiver. 3GPP defines RA configurations determining how often RA opportunities occur. In total 16 such configurations are defined, ranging from one RA opportunity every 20 ms (very low RA load) to one every 1 ms (very high RA load).

In TDD not all sub-frames are down link (DL) sub-frames reducing sub-frames that can be allocated to RA. To also in TDD configurations provide for high RA loads, multiple RA opportunities can be scheduled in a single sub-frame.

For FDD RA opportunities are restricted to the outermost 6 RBs of the physical uplink shared channel at the band edges.

The TDMA/FDMA structure of the RA opportunities in FDD is visualized in FIG. 6. Here only one 1.08 MHz band is allocated to RA at each time whereas several bands are possible in case of TDD. The RA opportunities always occur at the band edges of the physical uplink shared channel directly adjacent to the physical uplink control channel. In the example shown in FIG. 6, 3 RA opportunities with 1 ms length exist in each frame.

Preamble Format

FIG. 7a shows the detailed timing of the basic random-access preamble. The preamble is prefixed with a cyclic prefix (CP) to enable simple frequency domain processing. Its length is in the order of $T_{GP}+T_{DS}=97.5+5 \, \mu s=102.5 \, \mu s$, where $T_{DS}$ corresponds to the maximum delay spread and $T_{GP}$ corresponds to the maximum round trip time. The CP insures that the received signal is always circular (after removing the CP in the RA receiver) and thus can be processed by Fast Fourier Transformations (FFTs). Therefore, the "active" random-access preamble duration is $1000 \, \mu s-2 \cdot T_{GP}-T_{DS}=800 \, \mu s$. The RA subcarrier spacing is $1/800 \, \mu s=1250$ Hz.

FIGS. 7b to 7d show the extended preamble formats. Format 1 has an extended CP and is suited for cell radii up to approximately 100 km. However, since no repetition occurs this format is only suited for environments with good propagation conditions. Format 2 contains a repeated main preamble and a cyclic prefix of approximately 200 µs. With a RA opportunity length of 2 ms the remaining guard period is also approximately 200 µs. This format supports cell radii of up to approximately 30 km. Format 3 also contains a repeated main preamble and an extended CP. Using a RA opportunity length of 3 ms this format supports cell radii of up to approximately 100 km. In opposite to format 1 format 3 contains a repeated preamble and is therefore better suited for environments with bad propagation conditions.

Root Sequences in LTE

Preambles in LTE are based on Zadoff-Chu sequences. A Zadoff-Chu sequence of length N can be expressed, in the frequency domain, as $$X_{ZC}^{(u)}(k) = e^{-j\pi u \frac{k \cdot (k+1)}{N}}$$

where u is the index of the Zadoff-Chu sequence within the set of Zadoff-Chu sequences of length N=838. Out of one Zadoff-Chu sequence—in the following also denoted root sequence—multiple preamble sequences can be derived by cyclic shifting, were a shift is given by $s_{u,v}(n)=s_u(n-vN_{CS} \mod N)$ where $s_u$ is the inverse discrete Fourier transform (IDFT) of $X_{ZC}^{(u)}(k)$.

Due to the ideal ACF of Zadoff-Chu sequence multiple mutually orthogonal sequences can be derived from a single root sequence by cyclic shifting one root sequence multiple times the maximum allowed round trip time plus delay spread in time-domain. The number of shifts and as such the number of preambles that can be derived from a root sequence depends on, e.g., the coverage of the cell.

Preamble Detection

A receiver at the eNodeB correlates the received signal with all the root sequences (Zadoff-Chu sequences) allocated to the eNodeB, see FIG. 8. If the correlation (height of the correlation peak) due to a preamble is higher than the detection threshold, then the preamble is detected. However, if the correlation is lower than the detection threshold then the preamble is not detected. In the latter case there is a detection miss. The detection miss probability is the probability that the correlation between the root sequence and the received signal is less than the detection threshold when in fact a preamble was sent (i.e., there is a miss detection).

RACH Power Control

Power control for RACH in LTE is as follows:

$$P_{RACH}(N) = \min\{P_{MAX}, P_{O\_RACH}+PL+ (N-1)\Delta_{RACH}\Delta_{Preamble}\}.$$

where
  PRACH is the preamble transmit power,
  N=1, 2, 3, ... is the RACH attempt number
  $P_{MAX}$ is the maximum UE power, $P_{O\_RACH}$ is a 4-bit cell specific parameter signaled via BCCH with a granularity of 2 dB (difference in maximum and minimum $P_{O\_RACH}$ is 30 dB)

PL is the path loss estimated by the UE $\Delta_{RACH}$ is the power ramping step signaled via BCCH and represented by 2 bits (4 levels) with a granularity of 2 dB $\Delta_{Preamble}$ is a preamble-based offset (format 0-3), see Section 0 above.

Note that RACH attempts N=2, 3, 4, . . . includes retransmissions where no RA Response message has been received by the UE (see FIG. 4), the RA Response message is intended for another preamble (UE)

the contention resolution has failed and the UE has to try random access again.

In essence, the UE will increase its transmission power until network access is granted. There is typically an upper bound on the number of retransmissions and, thus, number of power increases.

Performance Indicators Related to Random Access

The UE performs a power ramping procedure, where the UE increases its power for the subsequent preamble transmission if the UE is not granted access due to a preamble detection miss or contention. The desired performance of RACH may be specified in terms of the access probability AP(m), which is the probability that the UE has access after a certain random access attempt number m=1, 2, 3 . . . . For example, we may require that the access probability should be greater than 0.8 and 0.95 at attempts 1 and 3, respectively, i.e. AP(1)>0.8 and AP(3)>0.95.

Alternatively, the desired performance may be specified in terms of the access delay, which is the delay from the initial random access attempt until access is granted. Similar to above, the RACH performance may be specified in terms of the access delay probability ADP($\delta$), which is the probability that the access delay is less than. It is possible to specify the desired performance in terms of two access delay requirements, e.g., ADP(20 ms)<0.8 and ADP(40 ms)<0.95.

Alternatively, the requirements may be specified in terms of access delay AD(p) for a given percentile p of the random access attempts, e.g., AD(0.8)<20 ms and AD(0.95)<40 ms implying that the access delay must be less than 20 ms and 40 ms for 80% and 95% of the random access attempts, respectively.

Furthermore, the access probability AP and access delay probability ADP are functions of two key factors, namely, the preamble detection miss probability and the contention probability. The detection miss probability DMP(m) at attempt m is the probability of a preamble, transmitted at attempt m, not being detected at the eNodeB. The contention probability CP is the probability that a UE is not granted access due to a preamble collision, i.e., that two or more UEs have chosen the same preamble (that are detected) during the same random access opportunity.

Uplink Control Signaling

To enable the base station eNB to acquire information from the UEs, different signaling mechanisms have been defined for LTE. The information can be UE internal, indicating for example buffer status or used power or it can be external indicating for example channel quality or received power.

L1 Control Signaling

Information with very tight time requirements are sent on the physical uplink control channel (PUCCH) or is multiplexed with uplink data transmissions on the physical shared channel (PUSCH). This transmission is fast but not as robust as it is not protected by any higher layer retransmissions. Examples of information that is sent with Layer 1 (L1) control signalling is HARQ ack/nacks, scheduling requests (SR) and channel quality indicators (CQI).

MAC Control Signaling

A more robust and dynamic way of sending uplink control information is by MAC control elements. Uplink transmissions on uplink shared channel (UL-SCH) consist of one or more MAC element. The elements are concatenated before channel coding and each has its own MAC header. The MAC control elements are slower than the L1 signaling since they may be retransmitted in case of decoding errors, but this also make them more robust against channel errors. Examples of information sent by MAC control elements are power headroom reports and buffer status reports. The type of control element is identified by a field LCID in the MAC header.

RRC Control Signaling

For slow reporting radio resource control (RRC) signaling is used. This reporting becomes very robust since it is protected by the Radio Link Control (RLC) Acknowledged Mode (AM) check, meaning that the data units are provided with sequence numbers, and received data units are acknowledged. This also makes this reporting rather slow, and the header overhead is rather large. But for slow reporting with a high number of bits it is a flexible and robust reporting. Measurements on neighbor cells, either on E-UTRAN or on other radio access technologies, are sent by RRC control signaling.

The flexible random access procedure in LTE is associated with a great number of parameters that affect the performance. Some of these parameters can be either set offline once and for all, or based on measurements in the eNodeB. Because the setting of the parameters affects the performance it is desired to provide a method and an apparatus enabling an efficient setting of the parameters. In order to enable efficient setting the performance needs to be observed.

Hence there exist a need for an improved method and apparatus for observing performance related to Random Access in an LTE system.

SUMMARY

It is an object of the present invention to provide an improved LTE system and in particular to provide an improved method and apparatus for observing performance related to Random Access in an LTE system.

This object and other are obtained by the method and apparatus as set out in the appended claims.

Thus, the inventors have realized that some parameters that are set for the random access procedure in a cellular radio system such as an LTE system relate to the situation perceived by the UE, and the network is unaware of the UE perception given the currently available measurements. For example, it is difficult to determine the access probability unless information about the number of preamble transmission attempt for a set of UEs is available.

In accordance with the present invention a method and a corresponding apparatus is provided for measuring and reporting information needed for observing the performance and behavior of random access in a cellular radio system such as an LTE system. In particular, the information relate to the situation perceived by the UE. It comprises entities to report to the network, mechanisms to configure the measurement reporting, and measurement report triggering in order to efficiently provide the network with relevant information.

Thus, the invention provides for a user equipment for obtaining data for observing performance related to Random Access in a cellular radio system. The user equipment can connect to the system. In order to provide the network/system with data for observing the random access procedure the user equipment measures and stores data needed to compute measurements to be reported to the system. The user equipment further generates a measurement report, and transmits the measurement report based on a trigger event.

In accordance with one embodiment the UE reports a number of preambles transmitted N and indicates whether a contention has occurred.

In accordance with one embodiment UE reports the number of preambles transmitted $N_m$, due to preamble detection miss and the number of preambles transmitted $N_c$ due to contention.

In accordance with one embodiment, the UE may report total number of preambles transmitted N and the number of retransmissions due to congestion $N_c$.

In accordance with one embodiment the UE reports the absolute time when a first random access attempt occurred.

In accordance with one embodiment the UE reports the difference between time when access is granted and the time when the first random access attempt occurred.

In accordance with one embodiment the UE reports an indicator, indicating whether the UE has used a transmission power equal to $P_{MAX}$ in any of the preamble transmission attempts, where $P_{MAX}$ is the maximum transmission power.

In accordance with one embodiment the UE receives a measurement and reporting setup to be used encoded in a Radio Resource Control (RRC), message, in particular a RRC Connection Setup message.

In accordance with one embodiment the UE reports are sent as Radio Resource Control, RRC messages.

In accordance with one embodiment a Random Access Channel, RACH, information report concerning a recent random access procedure is sent on demand when receiving a direct request from the system.

The invention also extends to a user equipment adapted to perform such methods. In addition the invention extends to a network node, in particular a radio base station, and a method in the network node for performing the corresponding method steps on the network side.

Thus, in a method and corresponding apparatus in a communication system for measuring and reporting information needed for observing the performance and behavior of random access in a cellular radio system, such as a LTE system measurements are generated in the UE and reported to the network, in particular the radio base station. In particular, the information relate to the situation perceived by the UE. The measurements reported to the network are configurable, and measurement report triggering can be set to efficiently provide the network with relevant information. The reported measurements can be used for improving the setting of Random access parameters used in the radio system by automatically setting radio access parameters in response to the measurements reported by the UEs.

BRIEF DESCRIPTION OF THE DRAWINGS

The present invention will now be described in more detail by way of non-limiting examples and with reference to the accompanying drawings, in which.

DETAILED DESCRIPTION

Figure 1:
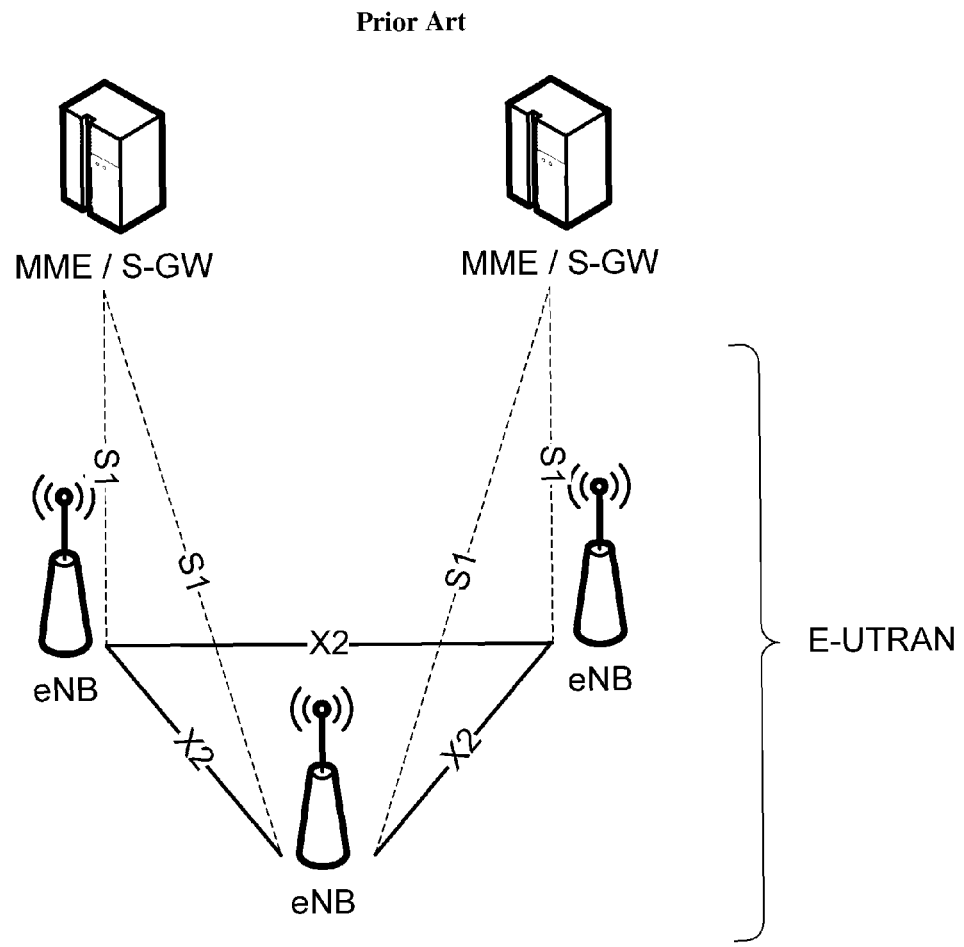
FIG. 1 is a view illustrating LTE architecture.
Figure 2:
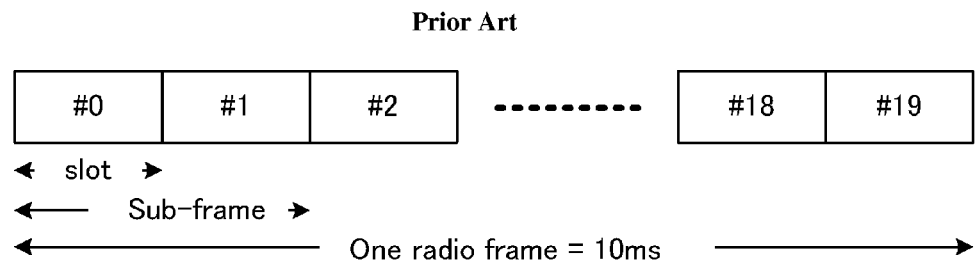
FIGS. 2 and 3 illustrate different frame structures.
Figure 3:
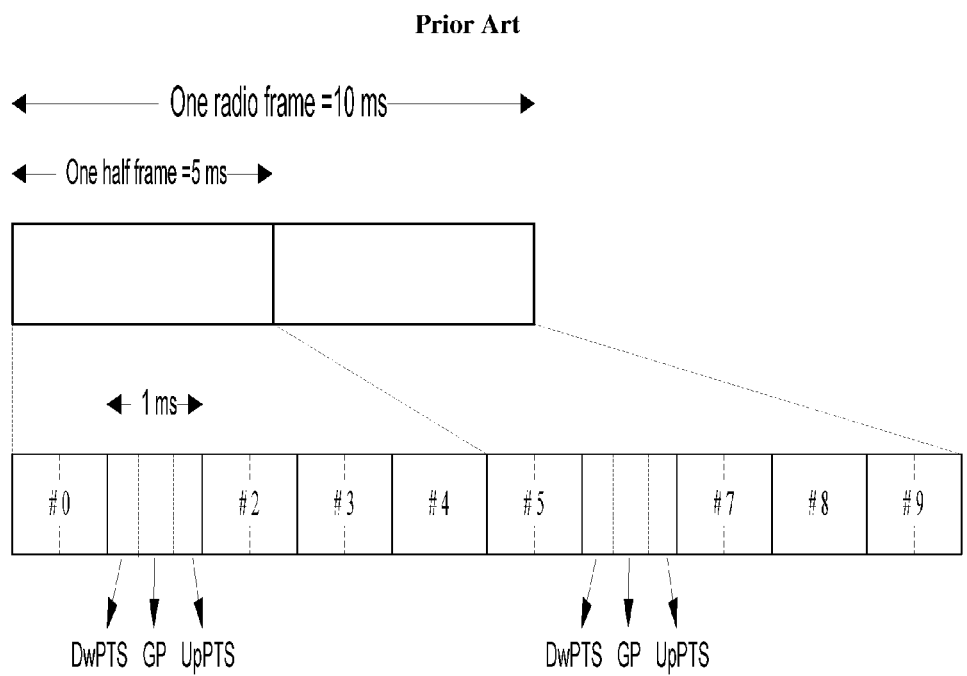
Figure 4:
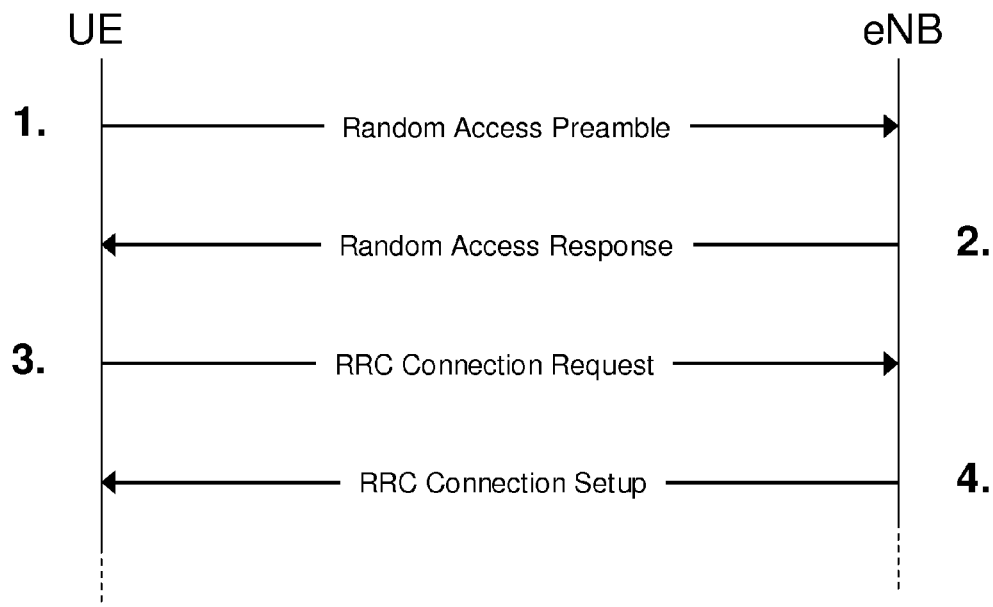
FIG. 4 illustrate a random access procedure.
Figure 5:
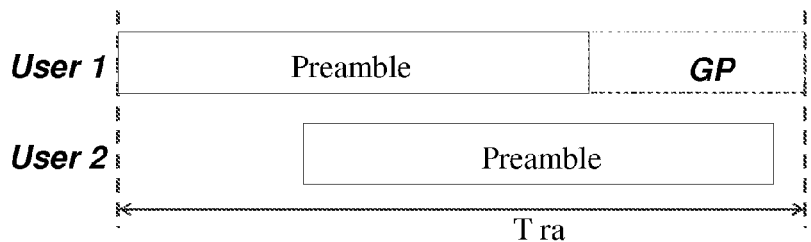
FIG. 5 illustrate access burst timing.
Figure 6:
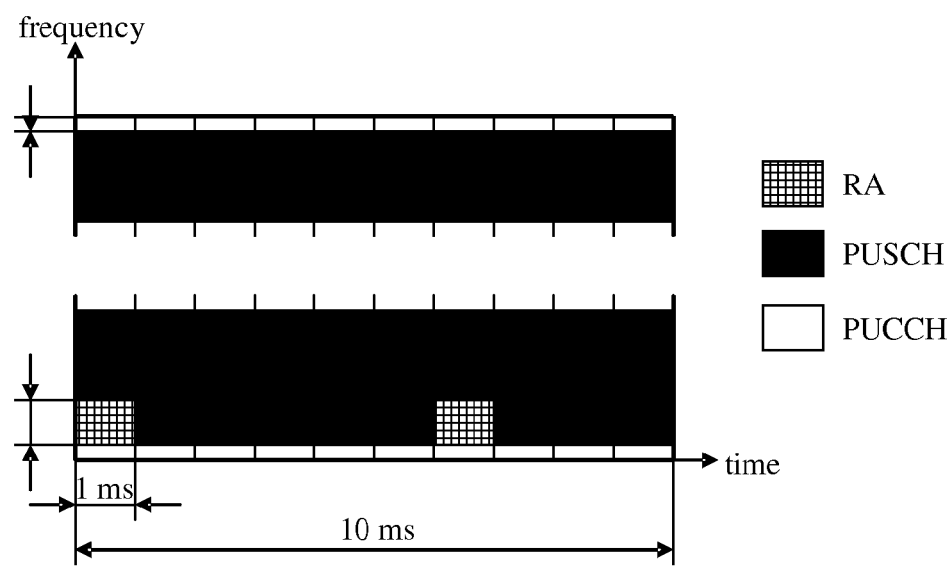
FIG. 6 illustrate Time-frequency structure of non-synchronized random access for FDD, FIG. 7 illustrate Random-access preambles, FIG. 8 illustrate a correlation procedure performed by the receiver in NodeB.
Figures 7A, 7B, 7C, 7D:
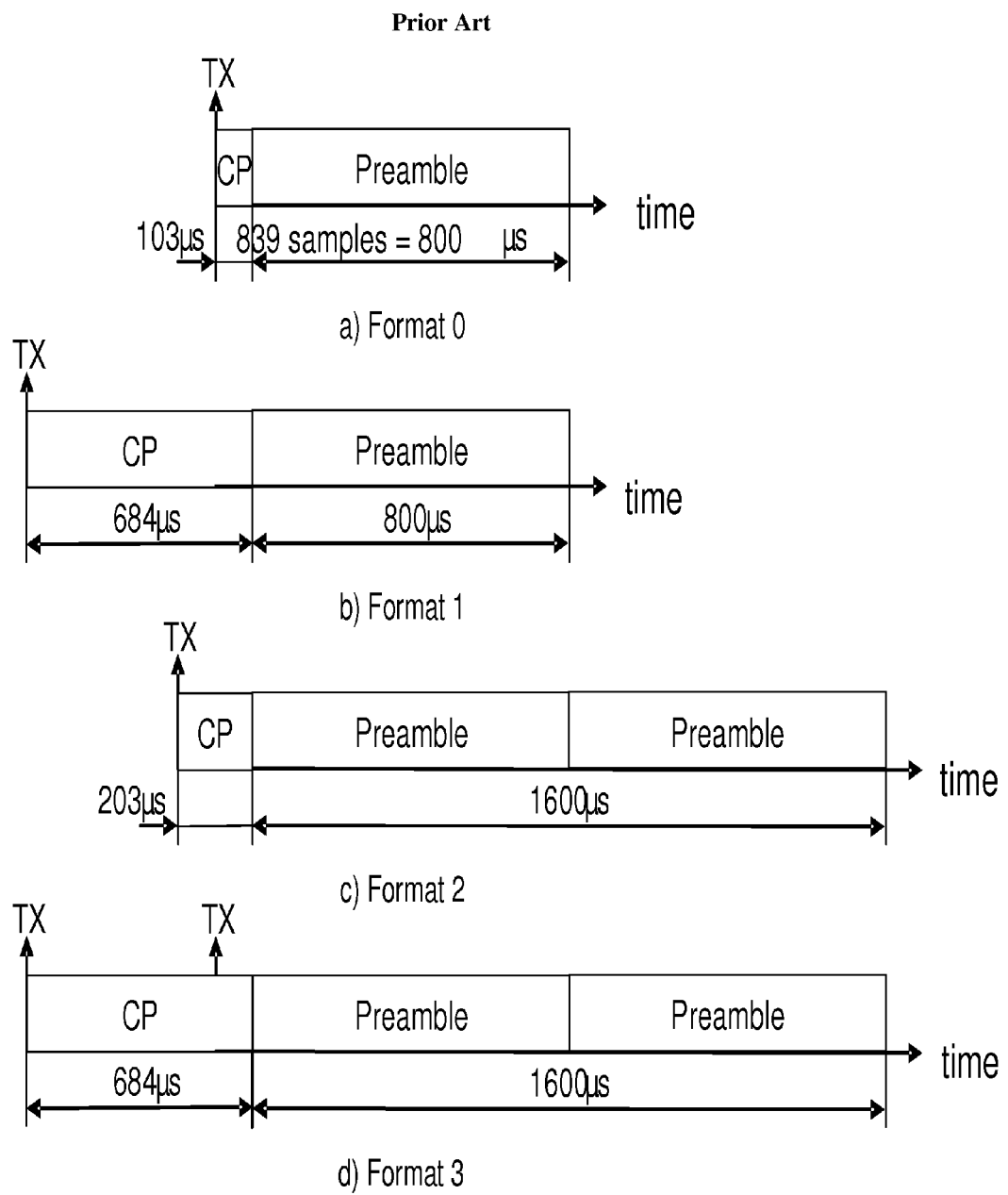
Figure 8:
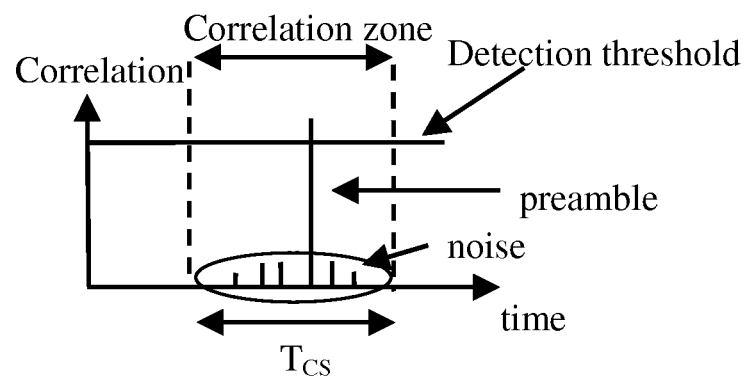

In accordance with one embodiment of the present invention a method comprising the following steps can be employed in order to provide for measuring and reporting information needed for observing the performance and behavior of random access in a cellular radio system such as an LTE system.

measurement, measurement setup, measurement reporting and triggering thereof.

Measurement

In order to estimate access probability, access delay, and whether the UEs are power limited the following measurement can be used either in isolation or in a suitable combination.

Measurements Related to Number of Preamble Transmission Attempts

A UE may not be granted access due to a preamble detection miss or a contention as described above. To estimate the access probability and the reason of failure given a random access attempt it is useful that the UE indicates and reports the number of preambles transmitted $N_m$ due to preamble detection miss and number of preambles transmitted $N_c$ due to contention. For example, assuming that the UE has required in total 5 attempt to acquire access, and that the number of preamble retransmissions due to detection miss is 3 and number of retransmissions due to contention is 1, then $N_m$=3 and $N_c$=1. Note, N=$N_m$+$N_c$+1 where N is the number of random access attempts.

In accordance with one embodiment, the UE may report total number of preambles transmitted N and the number of retransmissions due to congestion $N_c$. In the example above, this means N=5 and $N_c$=1.

In accordance with one embodiment, the UE may report total number of preambles transmitted N and the number of retransmissions due to detection miss $N_m$. In the example above, this means N=5 and $N_m$=3.

In accordance with one embodiment, the UE may report number of preambles transmitted N and indicate whether a contention has occurred. This is useful when estimating the probability of detection miss, i.e., DMP as retransmissions due to contentions are not captured in the statistics. In such a case, all reports where contention is indicated can be excluded from the DMP calculations.

In accordance with one embodiment, the UE may report only number of preambles transmitted $N_m$ due to preamble detection miss.

In accordance with one embodiment, the UE reports number of preambles transmitted N and indicate all retransmissions that were due to contention, for example as a bitmap where each bit indicates whether a transmitted preamble was retransmitted due to contention or not.

During a transient overload, the eNodeB may choose not to respond to a set of UEs, even through their preambles are detected. Essentially, the UEs perceive this as a preamble detection miss and this could cause estimation error when estimating the DMP. During an overload, the eNodeB may choose to set a backoff indicator in the Random Access Response message. The measurement entity $N_m$ defined above is be extended such that $N_m$ is the number of preambles transmitted due to preamble detection miss conditional that the backoff is not indicated (or B=0). Alternatively, the UE may indicate that backoff was applied during the random access procedure (for all attempts).

Measurements Related to Access Delay

To estimate the UE access delay AD it is useful that the UE indicates the time of the first random access attempt.

In a first mode, the UE reports the absolute time when the first random access attempt occurred. This can be done by indicating the SFN and the subframe at which the first random access attempt occurred.

In a second mode, the UE reports the difference between time when access is granted and the time when the first random access attempt occurred. For example, assume that the first attempt occurred at time SFN=100 and subframe 3, and the time when access is granted is SFN=102 and subframe 8. This implies that the access delay is 2 system frames and 5 subframes, which is equal to 25 ms. The AD may be reported in terms of e.g.,
- number of subframes $n_{sf}$ (from the initial attempt to when access is granted)
- number of random access opportunity slots $n_s$ that have passed since the first attempt
- intervals of subframe and random access opportunity slots, as exemplified in Table 1.
- Number of plausible opportunity slots excluding the slots the UE cannot use due to stipulated waiting times and timers

TABLE 1

Access delay expressed in term of intervals and represented by 2 bits

| Access delay interval | Access delay value (ms) |
|---|---|
| 1 | 1-2 |
| 2 | 3-5 |
| 3 | 6-10 |
| 4 | 11-20 |

Power Limitation Indication

In order to determine whether the UEs are power limited when transmitting the random access preamble, it is useful for the UEs to indicate this. In case UEs are power limited, a format enabling the transmission of repeated random access preambles doubles the received energy and increases the probability of a correct preamble detection.

The UEs may report an indicator, indicating whether the UE has used a transmission power equal to $P_{MAX}$ in any of the preamble transmission attempts, where $P_{MAX}$ is the maximum transmission power.

In accordance with one embodiment, the UEs can indicate their maximum desired transmission power over all attempts, where the desired transmission power is defined by:

$$P_{des} = P_{O\_RACH} + PL + (N-1)\Delta_{RACH} + \Delta_{Preamble}.$$

In accordance with one embodiment, a UE indicates whether its desired transmission power $P_{des}$ is greater than a certain threshold $P_{th}$.

In accordance with one embodiment, UEs may report the minimum power head room, i.e., the difference between the maximum transmission power and the desired transmission power, where power headroom is defined as, $$P_{HR} = P_{MAX} - P_{des} = P_{MAX} - (P_{O\_RACH} + PL + (N-1)\Delta_{RACH} + \Delta_{Preamble}).$$

In accordance with one embodiment, the UEs may report an indicator, indicating whether the UE has power headroom less than a threshold $P_{th}$ in any of the preamble transmission attempts, i.e., $$P_{HR} = P_{MAX} - P_{des} < P_{th}.$$

Combination of Measurements

It is to be understood that a suitable combination of the above mentioned measurements can be reported by the UEs. For example, the following measurements can be reported by the UEs:
- number of random access attempts and the contention indicator
- whether desired transmission power $P_{des}$ is greater than a specified threshold $P_{th}$.

Historic Measurements

Historic measurements are very useful in order to obtain a comprehensive and rich estimate of RACH related performance indicators. A UE reports a number of measurements as a function of time. The below description is not restricted to a particular notion of time, as time can be indicated by any notion that progresses with time, e.g., subframes and random access opportunities.

A subset (including the whole set) of the following measurements listed below can be reported by the UE:
- Time of each preamble transmission
- Time of the random access opportunity slots excluding the slots where
  - the UE cannot use due to stipulated waiting times and timers
  - the UE has transmitted a preamble
- Outcome of each preamble transmission, which can be one of the following values:
  - preamble detection miss,
  - overload, i.e., the preamble transmitted by the UE has not been detected and the backoff value>0 has been set by the eNodeB
  - contention resolution failure (i.e., the UE has lost the contention resolution)
  - access, i.e., the UE has been granted access
- Power limitation indication, e.g., transmission power
- Preamble transmitted The measurements can be encoded using a variety of ways as described below.

"Time of each random access attempt" and "Time of the random access opportunity slots excluding the slot"

This information can be encoded using a bitmask, i.e., a series of bits where each bit represents the state of a subframe. The value "1" indicates a preamble transmission, and value "0" indicates that the UE has not transmitted a preamble. The right end of the bitmask, the least significant bit, represents the subframe of the last attempt, which results in access. The left end of the bitmask, the most significant bit, represents the earliest subframe recorded.

Outcome of Each Preamble Transmission

For each indicated preamble transmission, the outcome may be encoded using 1-2 bits depending on the size of the set of outcomes. If only preamble detection miss and contention resolution failure are to be indicated then 1 bit suffices.

Power Limitation Indication

For each indicated preamble transmission, the power limitation indication can be encoded as:

The transmission power $P_{RACH}$, desired transmission power $P_{des}$, or power headroom $P_{HR}$ encoding with a certain precision alternatively encoding using tabular representation, where each row (value) is mapped to an interval of power.

1 bit, indicating whether the UE has used a transmission power equal to $P_{MAX}$ in any of the preamble transmission attempts 1 bit, indicating whether the desired transmission power $P_{des}$ (or the power headroom) is greater (less) than a certain threshold $P_{th}$ Measurement and Reporting Setup Below some exemplary measurement and reporting setup methods are described. A UE can be configured to:

measure and store data needed to compute the measurements that are to be reported, and report the measurement entities.

In one exemplary embodiment, the measurement and storage of data needed for computing the measurements, and reporting the measurements is activated or deactivated.

In one embodiment, the set of measurements that need to be reported are indicated, as well as, when the measurements are reported.

First Mode

In a first exemplary mode of operation the UEs are adapted to continuously measure and store data needed to compute the measurement and report measurements set to be reported.

Second Mode

In a second exemplary mode of operation the second mode, System Information, see 3GPP TS 36.331 Radio Resource Control, broadcasted throughout the cell carries the measurement and reporting setup.

Third Mode

In a third exemplary mode of operation, the measurement and reporting is setup using RRC signalling. In case of measurement reporting via MAC control elements, the MAC configuration for the uplink shared channel can be modified to either include an indicator that enables the measurement, storage of data needed to compute the measurement entities, and reporting of RACH measurement entities after successful random access, or more detailed information about what the RACH measurement report shall contain and when it should be reported.

If the MAC configuration in the current RRC context enables RACH measurement reporting, then the UE reports the MAC control element together with the next uplink transmission, or within a configurable time after a successful RA procedure.

If the UE receives an updated MAC configuration via RRC Connection Reconfiguration, the UE may report the RACH measurement concerning the most recent successful RA procedures (according to the most recent configuration).

In case of autonomous measurement reporting via RRC as described above, the UE is informed about whether a RACH measurement report is expected after a successful RA procedure, the report contents (may be optional), and a timer within which the information is expected (may be optional).

If the RACH reporting is enabled, the UE reports the UER-ACHInformation as configured.

Fourth Mode

In a fourth exemplary mode of operation, the measurement and reporting setup is encoded in the Random Access Response message.

Fifth Mode

In a fifth exemplary mode of operation, the measurement and reporting setup is encoded in an RRC message. In particular the measurement and reporting setup is encoded in an RRC Connection Setup message.

Measurement Report Triggering

The reporting of measurements can be triggered in a number of different ways. Some examples are given below.

MAC Reporting

The RACH measurement entities (RACH information) can be reported using a MAC control element. A basic solution is to report the RACH information when data is transmitted on PUSCH after every successful RACH attempt. To limit the amount of overhead, a UE can be configured with a set of report triggers. The report triggers can for example be set as follows:

The UE transmits RACH information when one or multiple of a set of reporting trigger conditions, including e.g. the following conditions, are met:

A. The number of successful RA attempts since a RA report was previously transmitted is more than $Th1_{attempts}$ B. The time which has elapsed since a RA report was previously reported is more than $Th1_T$ C. Number of RA attempts N is larger than $Th1_N$ and smaller than $Th2_N$ D. Access delay, for example, $n_{sf}$ larger than $Th1_{nsf}$ and smaller than $Th2_{nsf}$ E. $N_m$ is larger than $Th1_{Nm}$ and smaller than $Th2_{Nm}$ F. The difference between the maximum transmission power $P_{MAX}$ and transmission power $P_{RACH}$ used, e.g. in the last RA attempt, is greater than $Th1_P$ dB.

G. $N_c$ is larger than $Th1_{Nc}$ and smaller than $Th2_{Nc}$.

H. The power headroom $P_{HR}$ is smaller than $Th1_{PHR}$

The thresholds Th1* and Th2* (where "*" represents a variable) defined above can all be configured using higher-layer signaling (RRC) or be constants.

Figure 9:
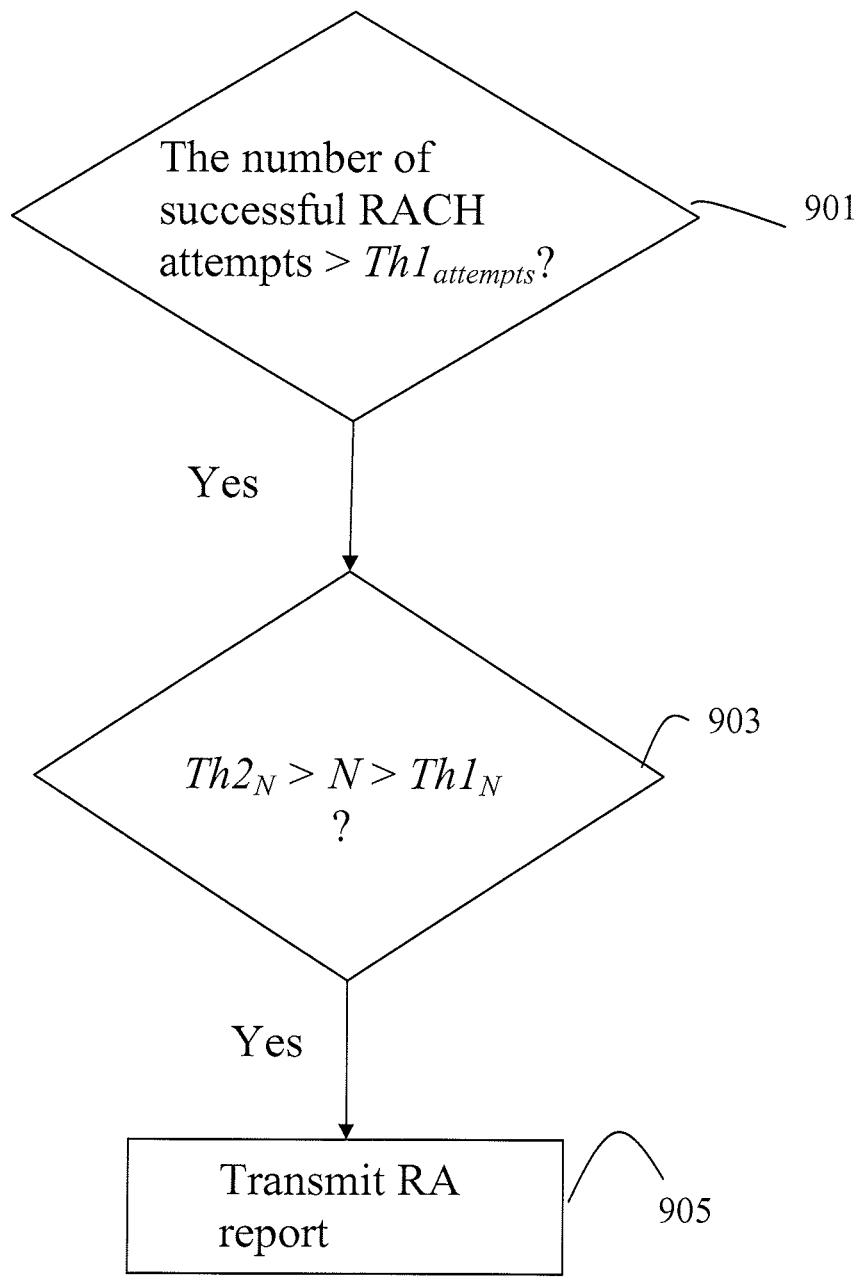
FIG. 9 is a flow chart illustrating some procedural events performed in a UE when triggering a report.

A flowchart illustrating procedural steps performed in an exemplary UE configured with triggers is shown in FIG. 9. Thus, first in a step 901 it is checked if the number N is larger than a first threshold. Next, in a step 903 it is checked if the number is smaller than is larger than $Th1_{Nc}$ and smaller than $Th2_{Nc}$. If the answer is yes both in steps 901 and 903 a transmit RA report is triggered.

Some of these triggers can be configured in such a way that the eNB obtains useful information also when no report is triggered. There are several examples. In the examples trigger A is used with $Th1_{attempts}=0$, but combinations are not limited to this case.

In one embodiment the UE can be configured with a reporting trigger C with $Th1_N=1$ and $Th2_N=$Infinity. This trigger combination means that the eNB knows that if it gets no report, the number of required RA attempt is 1.

Another embodiment is to configure the UE with reporting trigger F. If the eNB does not receive a RACH report it knows that the difference between maximum power $P_{MAX}$ and used power $P_{RACH}$ is smaller than $Th1_P$ dB.

A third embodiment is to configure the UE with reporting trigger G, with $Th1_{Nc}=1$ and $Th2_{Nc}=$Infinity. If the eNB does not receive a report in this case it knows that no RACH attempts have failed due to contention.

A fourth embodiment is to configure the UE with reporting trigger C, $Th1_N=1$, $Th2_N=$Infinity, trigger F, $Th1_P=0$, and trigger G, $Th1_{Nc}=-1$, $Th2_{Nc}=1$. In this case the eNB will only receive a report if the UE failed a RACH attempt due to detection misses.

A fifth embodiment is to configure the UE with reporting trigger H, $Th1_{PHR}=0$ dB. In this case the eNodeB will only receive a report if the UE is power limited.

In the report it is possible to include information about the latest attempt to access or gather information over a longer configurable period or number of attempts.

The report triggers defined above may also be applied for other reporting methods such as RRC reporting.

RRC Reporting

In one embodiment, the UE reports are sent as RRC messages meaning that the message reporting is based on RRC messages.

Figure 10:
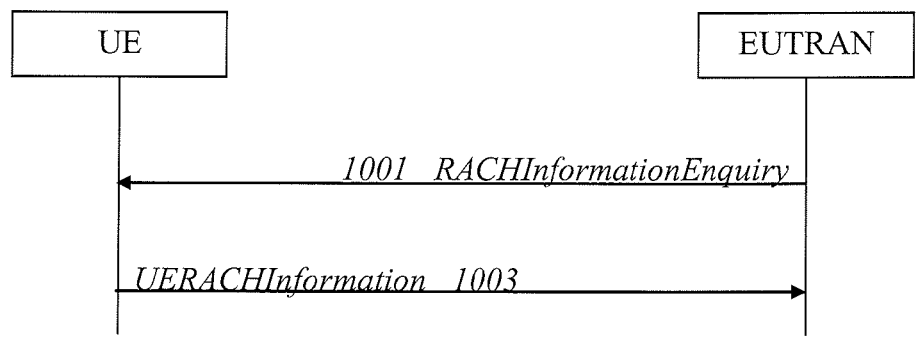
FIG. 10 is a view illustrating a Random access procedure information report sent on demand.

Also, in one exemplary embodiment, a RACH information report 1001 concerning a recent random access procedure is sent on demand after a direct request 1003 from the network. This is depicted in FIG. 10.

In one exemplary embodiment, the RACH information report is triggered by a successful RA procedure and sent as an RRC message, either as soon as possible of within a configurable time.

Figure 11:
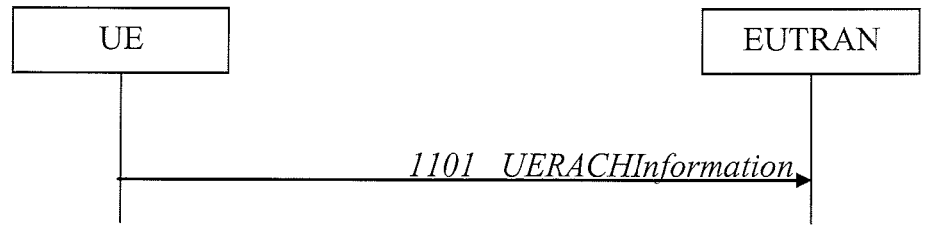
FIG. 11 is a view illustrating a RACH information report triggered by a successful RA procedure.

FIG. 11 depicts Random access procedure information report 1101 sent possibly within a configurable time to E-UTRAN triggered by a successful RA process.

Using the methods and apparatuses as described above alleviates shortcoming with known solutions for observing the performance of random access in a cellular radio system in particular an LTE system. In particular, the information related to the situation experienced by the UE, which partially cannot be observed using existing technology, can be observed using the described methods and apparatuses. This enables not only accurate and comprehensive observation of random access performance, but also it enables automatic tuning of the random access channel and related procedures. This in turn has several implications, e.g., Very little or no human intervention is required when optimizing RA parameters, resulting in a reduction of OPEX.

The methods presented are based on feedback information and, as such, the RA optimization process is responsive to changes in radio propagation conditions in the cell.

Radio propagation models based on, e.g., topology, are not needed, since the invention relies on the feedback information from the User Equipment and Base stations.

Figure 12:
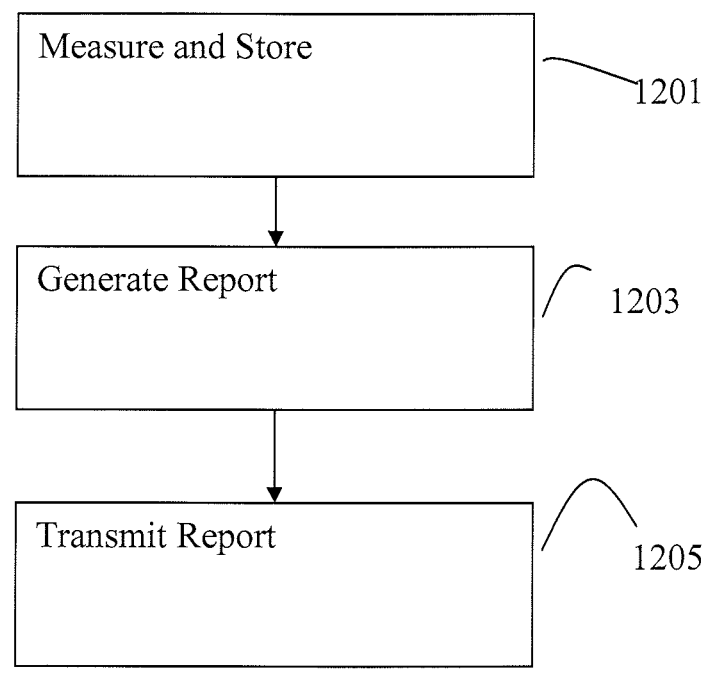
FIG. 12 is a view illustrating steps performed when providing random access performance and behavior information for a cellular radio network.

In FIG. 12 some steps performed in a user equipment when providing data for observing performance related to Random Access in a cellular radio system are depicted. First in a step 1201, the UE measures and stores data needed to compute measurements to be reported. The UE can be configured to determine the relevant data in a number of different ways as is described above. Next, in a step 1203, the UE generates a measurement report comprising the relevant data. Thereupon, the measurement report is transmitted to the cellular radio system based on a trigger event in a step 1205.

Figure 13:
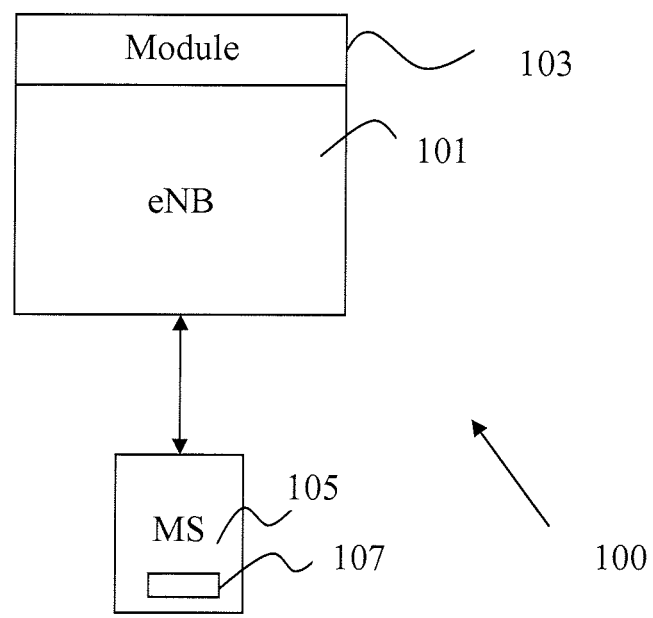
FIG. 13 is a view of a cellular radio system adapted to observe performance and behavior of the random access in a cellular radio network.

In FIG. 13 a cellular radio system 100 such as an LTE system is depicted. FIG. 13 depicts a Base station eNB 101 comprising a module 103 for set up and reception of observed performance related Random Access in a cellular radio system. FIG. 13 further depicts one of possibly many User Equipments (UE) 105 communicating with the base station 101. The UE comprises a unit 107 for measuring and storing data needed to compute measurements to be reported. The UE can be configured to determine the relevant data in a number of different ways as is described above.

The unit 107 is also adapted to generate a measurement report comprising the relevant data to be reported based on a trigger event.

Thus, in a method and corresponding apparatus in a communication system for measuring and reporting information needed for observing the performance and behavior of random access in a cellular radio system, such as a LTE system measurements are generated in the UE and reported to the network, in particular the radio base station. In particular, the information relate to the situation perceived by the UE. The measurements reported to the network are configurable, and measurement report triggering can be set to efficiently provide the network with relevant information. The reported measurements can be used for improving the setting of Random access parameters used in the radio system by automatically setting radio access parameters in response to the measurements reported by the UEs.

The invention claimed is:

1. A method in a user equipment of reporting information for observing performance of random access in a cellular radio system, the method comprising:
    storing data needed to compute measurements that are to be reported and that are associated with a most recent random access procedure performed by the user equipment;
    computing said measurements;
    generating a measurement report for said measurements to include an indication of whether a contention has occurred during said most recent random access procedure;
    receiving a direct request from a radio base station for said measurement report responsive to said most recent random access procedure being successful; and
    transmitting the measurement report responsive to said request.

2. The method according to claim 1, wherein the user equipment has transmitted one or more preambles in attempting to acquire random access during said most recent random access procedure, and wherein computing said measurements comprises computing the number of said preambles that the user equipment has transmitted due to preamble detection miss and the number of said preambles that the user equipment has transmitted due to the occurrence of a random access contention.

3. The method according to claim 1, wherein computing said measurements comprises computing the absolute time when the user equipment first attempted random access during said most recent random access procedure.

4. The method according to claim 1, wherein computing said measurements comprises computing the difference between the time when random access during said most recent random access procedure is granted and the time when the user equipment first attempted random access during said most recent random access procedure.

5. The method according to claim 1, wherein said generating comprises generating the measurement report to include an indication of whether the user equipment has used a maximum transmission power in any random access attempt during said most recent random access procedure.

6. The method according to claim 1, further comprising receiving control signaling that is encoded in a Radio Resource Control message and that relates to setup of said measurements and said reporting.

7. The method according to claim 1, wherein said transmitting comprises transmitting the measurement report as a Radio Resource Control message.

8. The method according to claim 1, wherein said transmitting comprises transmitting the measurement report via Media Access Control (MAC) control elements.

9. The method according to claim 1, wherein said measurement report comprises a Random Access Channel, RACH, information report.

10. The method according to claim 1, wherein the user equipment has transmitted one or more preambles in attempting to acquire random access during said most recent random access procedure, and wherein computing said measurements comprises computing the total number of preambles that the user equipment has transmitted and the number of preambles that the user equipment has transmitted due to the occurrence of a random access contention.

11. The method according to claim 1, wherein the most recent random access procedure comprises the procedure that the user equipment most recently uses in attempting random access including one or more random access attempts, the last of which succeeds.

12. A method in a radio base station of obtaining data from a user equipment for observing performance related to random access in a cellular radio system, the method comprising transmitting to the user equipment a direct request for a measurement report responsive to the user equipment's most recent random access procedure being successful, and, responsive to said request, receiving from the user equipment reported data of measurements that have been performed by the user equipment and that are associated with said most recent random access procedure, wherein the reported data includes an indication of whether a contention has occurred during said most recent random access procedure.

13. The method according to claim 12, wherein said measurement report comprises a Random Access Channel, RACH, information report.

14. The method according to claim 12, further comprising transmitting control signaling that is encoded in a Radio Resource Control, RRC, message and that relates to setup of said measurements and reporting.

15. The method according to claim 12, wherein the most recent random access procedure comprises the procedure that the user equipment most recently uses in attempting random access including one or more random access attempts, the last of which succeeds.

16. A user equipment configured to report data from which performance related to random access in a cellular radio system can be observed, the user equipment comprising:
 a processor and a memory, said memory containing instructions executable by said processor whereby the user equipment is configured to:
  store data needed to compute measurements that are to be reported and that are associated with a most recent random access procedure performed by the user equipment;
  compute said measurements;
  generate a measurement report for said measurements to include an indication of whether a contention has occurred during said most recent random access procedure;
  receive a direct request from a radio base station for said measurement report responsive to said most recent random access procedure being successful; and
  transmit the measurement report responsive to said request.

17. The user equipment according to claim 16, wherein the user equipment is configured to transmit one or more preambles in attempting to acquire random access during said most recent random access procedure, and to compute said measurements by computing the number of said preambles that the user equipment has transmitted due to preamble detection miss and the number of said preambles that the user equipment has transmitted due to the occurrence of a random access contention.

18. The user equipment according to claim 16, wherein user equipment is configured to compute said measurements by computing the absolute time when the user equipment first attempted random access during said most recent random access procedure.

19. The user equipment according to claim 16, wherein user equipment is configured to compute said measurements by computing the difference between the time when random access during said most recent random access procedure is granted and the time when the user equipment first attempted random access during said most recent random access procedure.

20. The user equipment according to claim 16, wherein the user equipment is further configured to generate the measurement report to include an indication of whether the user equipment has used a maximum transmission power in any random access attempt during said most recent random access procedure.

21. The user equipment according to claim 16, wherein the user equipment is further configured to receive control signaling that is encoded in a Radio Resource Control message and that relates to setup of said measurements and said reporting.

22. The user equipment according to claim 16, wherein user equipment is configured to transmit the measurement report via Media Access Control, MAC, control elements.

23. The user equipment according to claim 16, wherein user equipment is configured to transmit the measurement report as a Radio Resource Control, RRC message.

24. The user equipment according to claim 16, wherein said measurement report comprises a Random Access Channel, RACH, information report.

25. The user equipment according to claim 16, wherein the user equipment is configured to transmit one or more preambles in attempting to acquire random access during said most recent random access procedure, and to compute said measurements by computing the total number of preambles that the user equipment has transmitted and the number of preambles that the user equipment has transmitted due to the occurrence of a random access contention.

26. The user equipment according to claim 16, wherein the most recent random access procedure comprises the procedure that the UE most recently uses in attempting random access including one or more random access attempts, the last of which succeeds.

27. A radio base station configured to obtain data from a user equipment for observing performance related to Random Access in a cellular radio system, the radio base station comprising a transceiver configured to transmit to the user equipment a direct request for a measurement report responsive to the user equipment's most recent random access procedure being successful, and, responsive to said request, receive from the user equipment reported data of measurements that have been performed by the user equipment and that are associated with said most recent random access procedure, wherein the reported data includes an indication of whether a contention has occurred during said most recent random access procedure.

28. The radio base station according to claim 27, wherein said measurement report comprises a Random Access Channel, RACH, information report.

29. The radio base station according to claim 27, wherein the transceiver is further configured to transmit control signaling that is encoded in a Radio Resource Control, RRC, message and that relates to setup of said measurements and reporting.

30. The radio base station according to claim 27, wherein the most recent random access procedure comprises the procedure that the UE most recently uses in attempting random access including one or more random access attempts, the last of which succeeds.

* * * * *